United States Patent [19]

Navratil et al.

[11] Patent Number: 4,655,786

[45] Date of Patent: Apr. 7, 1987

[54] PROCESS FOR DYEING HYDROPHOBIC FIBRE MATERIAL WITH DISPERSE DYE AND SURFACTANT

[75] Inventors: Josef Navratil, Basel; Heinz Abel, Reinach, both of Switzerland

[73] Assignee: Ciba-Geigy Corporation, Ardsley, N.Y.

[21] Appl. No.: 669,415

[22] Filed: Nov. 8, 1984

[30] Foreign Application Priority Data

Nov. 15, 1983 [CH] Switzerland .................. 6138/83

[51] Int. Cl.⁴ .................. C09B 67/38; D06P 1/16; D06P 5/20

[52] U.S. Cl. .................................. 8/475; 8/148; 8/158; 8/400; 8/636; 8/662; 8/922; 8/147

[58] Field of Search .................. 8/158, 148, 662, 636, 8/475

[56] References Cited

U.S. PATENT DOCUMENTS

| | | | |
|---|---|---|---|
| 4,089,644 | 5/1978 | Carbowell et al. | 8/400 |
| 4,125,371 | 11/1978 | Beutler et al. | 8/502 |
| 4,249,902 | 2/1981 | Kruckenberg et al. | 8/525 |
| 4,255,154 | 3/1981 | Zurbuchen et al. | 8/638 |
| 4,432,770 | 2/1984 | Hasler et al. | 8/475 |
| 4,491,955 | 1/1985 | Glawder | 8/158 |
| 4,518,392 | 5/1985 | Mollet et al. | 8/475 |

FOREIGN PATENT DOCUMENTS

| | | |
|---|---|---|
| 2901666 | 7/1980 | Fed. Rep. of Germany . |
| 3109954 | 9/1982 | Fed. Rep. of Germany . |
| 53-046327 | 4/1978 | Japan . |
| 1404545 | 9/1975 | United Kingdom . |
| 2014618 | 8/1979 | United Kingdom . |
| 1561988 | 3/1980 | United Kingdom . |
| 1575399 | 9/1980 | United Kingdom . |

OTHER PUBLICATIONS

P. Becher, Emulsions: Theory and Practice (1977) (Abstract).

*Primary Examiner*—A. Lionel Clingman
*Attorney, Agent, or Firm*—Edward McC. Roberts; Meredith C. Findlay; Kevin T. Mansfield

[57] ABSTRACT

The invention relates to a process for dyeing hydrophobic fibre material under HT conditions with unformulated disperse dyes from an aqueous liquor, which process comprises dissolving one or more such dyes in water, in the temperature range from 70° to 100° C., with a surfactant or mixture of surfactants which has a hydrotropic action on disperse dyes, feeding the dye solution into a dyeing apparatus which contains water heated to 70° to 100° C. and substrate, and subsequently heating the dye liquor to dyeing temperature, or dissolving the dye at a temperature of over 100° C. under pressure by means of the surfactant or mixture of surfactants which has a hydrotropic action on the dye, feeding the solution into a closed dyeing apparatus which contains water heated to 100° to 150° C. and substrate, and, in both cases, carrying out dyeing in the temperature range from 120° to 150° C. with constant circulation of the dye liquor.

The advantage of this process is that disperse dyes can be used direct for dyeing e.g. polyester without complicated grinding and formulation procedures.

16 Claims, No Drawings

PROCESS FOR DYEING HYDROPHOBIC FIBRE MATERIAL WITH DISPERSE DYE AND SURFACTANT

The present invention relates to a process for dyeing hydrophobic material under HT conditions with unformulated disperse dyes and to the fibre material dyed by said process.

Hydrophobic material, in particular polyester yarns or also wovens or knits made from polyester fibres, are dyed with disperse dyes either under normal pressure in the temperature range up to 100° C. in the presence of a carrier, or in a closed dyeing apparatus in the temperature range from 120° to 150° C. under pressure. Both processes suffer from the drawback that the disperse dyes required for carrying them out must be in a stable dispersion of as fine particles as possible. After being synthesised, the dyes must consequently be subjected to lengthy grinding operations, for example in stirred ball mills or sand mills, together with suitable dispersants. Finally, the comminuted disperse dye must be converted into a stable liquid formulation which does not reagglomerate, or be subjected to a mild drying process in order to obtain a dye powder which disperses rapidly in the dye liquor without forming lumps.

To obviate this complicated grinding and formulating process, European patent application No. 0060433 postulates an HT dyeing process for polyester piece goods that is carried out with disperse dyes which are unformulated, i.e. which are not subjected to an aftertreatment, in particular to wet grinding, following the synthesis. The essential feature of this known process is that, during dyeing, the bulk of the dye is present in the liquor as undissolved solid dye. This process is thus virtually limited to piece dyeing in jet dyeing machines. When dyeing packages in circulation dyeing machines, the undissolved dye inevitably deposits onto the yarn or woven fabric.

Surprisingly, it has now been found that hydrophobic fibre material, in particular polyester fibre material, can be dyed with unformulated disperse dyes regardless of make-up or dyeing apparatus, if said disperse dyes are dissolved in water, before they are put into the dyeing apparatus, with the aid of a surfactant or mixture of surfactants which has a hydrotropic action on disperse dyes.

Accordingly, the present invention relates to a process for dyeing hydrophobic fibre material under HT conditions with unformulated disperse dyes from an aqueous liquor, which process comprises dissolving one or more such dyes in water, in the temperature range from 70° to 100° C., with a surfactant or mixture of surfactants which has a hydrotropic action on disperse dyes, feeding the dye solution into a dyeing apparatus which contains water heated to 70° to 100° C. and substrate, and subsequently heating the dye liquor to dyeing temperature, or dissolving the dye at a temperature of over 100° C. under pressure by means of the surfactant or mixture of surfactants which has a hydrotropic action on the dye, feeding the solution into a closed dyeing apparatus which contains water heated to 100° to 150° C. and substrate, and, in both cases, carrying out dyeing in the temperature range from 120° to 150° C. with constant circulation of the dye liquor.

The disperse dyes eligible for use in the process of this invention can belong to a wide range of dyestuff classes. In particular they are azo, anthraquinone, nitro, methine, styryl, azostyryl, naphthoperinone, quinophthalone, acridone or naphthoquinonimine dyes which do not contain water-solubilising groups.

Preferred disperse dyes are metal-free monoazo or disazo dyes, nitro dyes, acridone dyes, anthraquinone dyes or quinophthalone dyes. Dyes which have a sufficient water-solubility for use in the process of the invention in the presence of hydrotropic agents can be readily selected by means of appropriate preliminary experiments.

In principle, the dyes can be employed without being subjected to any aftertreatment, in particular to wet grinding, e.g. direct from the synthesis, for example in the form of the moist filter cake or also as aqueous suspension. It is expedient, however, to dilute the dye with the appropriate amount of diluent in order to adjust the standard colour strength, to homogenise and, if desired, subsequently to dry the dye. It will be readily understood by those skilled in the art that the process can also be carried out with commercially available formulated dyes or with unformulated dyes in admixture with formulated dyes.

The disperse dye or dyes are put in the form of a hot aqueous solution into the dyeing apparatus. The term "solution" will here be understood as meaning a true monomolecular solution, a colloidal solution, and a microdispersion. The dye will accordingly be added to the dye liquor in dissolved, solubilised or microdispersed form.

The dye solution is fed to the liquor circulating in the dyeing apparatus either by a single addition of the entire solution, prepared for example in a feed tank connected to the dyeing apparatus, or by adding it in portions. Portionwise addition can be made by appropriate control, e.g. in relation to the number of pumping cycles, or also subject to the heating-up rate if the dye solution is added gradually to the liquor while heating to dyeing temperature. Further, the dye solution will conveniently have the same temperature as the circulating liquor when fed into the dyeing apparatus.

In the practice of this invention, a surfactant or mixture of surfactants which has a hydrotropic action on the disperse dye is used in order to dissolve the disperse dye in water in the temperature range from 70° to 150° C. The surfactants employed are preferably anionic and cationic surfactants. Amphoteric surfactants are also suitable. However, mixtures of a nonionic and an anionic surfactant have proved particularly useful.

As anionic surfactants with hydrotropic properties it is preferred to use adducts of ethylene oxide and/or propylene oxide with saturated or unsaturated fatty acids, fatty alcohols, fatty amines, alicyclic alcohols or aliphatic-aromatic hydrocarbons which are terminally esterified by an inorganic oxygen-containing acid or a polybasic carboxylic acid. Specifically, the anionic surfactants are compounds of the formula I

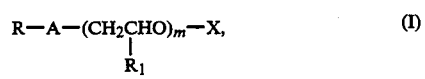

wherein R is an aliphatic hydrocarbon radical of 8 to 22 carbon atoms, or a cycloaliphatic or aliphatic-aromatic hydrocarbon radical of 10 to 22 carbon atoms, $R_1$ is hydrogen or methyl, A is —O—, —NH— or

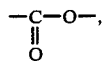

X is the acid radical of an inorganic oxygen-containing acid or the radical of a polybasic carboxylic acid, and m is an integer from 1 to 20, preferably from 1 to 5. The radical R—A is derived e.g. from higher alcohols such as decyl alcohol, lauryl alcohol, tridecyl alcohol, myristyl alcohol, cetyl alcohol, stearyl alcohol, oleyl alcohol, arachidyl alcohol, hydroabietyl alcohol or behenyl alcohol; and also from fatty amines such as stearylamine, palmitylamine or oleylamine; from fatty acids such as caprylic acid, capric acid, lauric acid, myristic acid, palmitic acid, stearic acid, arachinic acid, behenic acid, coconut ($C_1$–$C_{18}$)fatty acid, decenoic acid, dodecenoic acid, tetradecenoic acid, hexadecenoic acid, oleic acid, linolic acid, linolenic acid, eicosenic acid, docosenoic acid or clupadonic acid; from alkylphenols such as butylphenol, hexylphenol, n-octylphenol, n-nonylphenol, p-tert-octylphenol, p-tert-nonylphenol, decylphenol, dodecylphenol, tetradecylphenol or hexadecylphenol. Preferred radicals are those containing 10 to 18 carbon atoms, in particular those derived from alkylphenols.

The acid radical X is usually derived from a low molecular dicarboxylic acid, for example from maleic acid, malonic acid, succinic acid or sulfosuccinic acid, and is attached through an ester bridge to the radical R—A—(CH$_2$CHR$_1$O)$_m$—. In particular, however, X is derived from an inorganic polybasic acid such as orthophosphoric acid and sulfuric acid. The acid radical X is preferably in salt form, for example as alkali metal, ammonium or amine salt. Examples of such salts are sodium, potassium, ammonium, trimethylamine, ethanolamine, diethanolamine or triethanolamine salts.

These compounds are prepared by known methods by adding ethylene oxide and/or propylene oxide to the above-mentioned alcohols, fatty amines, acids and alkylphenols, and subsequently esterifying the alkoxylates so obtained and, if desired, converting the esters into their salts. Such surfactants are known for example from U.S. Pat. No. 3,211,514.

Of this group of anionic surfactants it is in turn preferred to use the acid sulfuric acid esters of alkylphenol ethoxylates, i.e. those compounds of the indicated formula, wherein R—A— is the radical of an alkylphenol, R$_1$ is hydrogen, m has the given meaning and X is a sulfuric acid radical.

To be mentioned specifically are the adducts of 1 mole of butylphenol and 3 moles of ethylene oxide, of 1 mole of tributylphenol and 5 moles of ethylene oxide, of 1 mole of nonylphenol and 2 moles of ethylene oxide, of 1 mole of nonylphenol and 10 moles of propylene oxide or ethylene oxide, of 1 mole of nonylphenol and 20 moles of ethylene oxide, of 1 mole of dodecylphenol and 4 moles of ethylene oxide or of 1 mole of pentadecylphenol and 5 moles of ethylene oxide, which adducts are esterified with sulfuric acid. The sulfuric acid hemiesters of the above alkoxylates are preferably in the form of ammonium salts. If desired, mixtures of anionic surfactants can also be used.

Suitable cationic surfactants with hydrotropic properties are, in particular, quaternary ammonium compounds of the formula II

wherein
R$_1$ is a saturated and/or unsaturated C$_8$–C$_{22}$alkyl radical,
R$_2$ is a C$_1$–C$_4$alkyl radical or a polalkylene oxide chain containing 3 to 30 ethylene oxide and/or propylene oxide units or ethylene oxide and styrene oxide units,
R$_3$ is a C$_1$–C$_4$alkyl radical which is unsubstituted or substituted by a hydroxy, methoxy or ethoxy group or by a carbamoyl or phenyl radical,
X$^\ominus$ is the anion of an organic or inorganic acid, for example chloride, bromide, sulfate or methosulfate, which compounds contain a higher alkyl radical.

Such compounds are known or they can be obtained by known methods, for example by reacting a fatty amine or a mixture of fatty amines, for example coconut fatty amine, with ethylene oxide and/or propylene oxide and subsequently quaternising the alkoxylate so obtained, e.g. with dimethyl sulfate (q.v. for example H. Stache, Tensid-Taschenbuch, Carl Hanser Verlag 1981).

Representative examples of quaternary fatty amine alkoxylates are:
the adduct of 8 moles of ethylene oxide and 1 mole of tallow fatty amine, quaternised with chloroacetamide,
the adduct of 30 moles of ethylene oxide and 1 mole of a C$_{18}$–C$_{22}$fatty amine, quaternised with dimethyl sulfate,
the adduct of 30 moles of ethylene oxide and 1 mole of laurylamine, quaternised with dimethyl sulfate,
the adduct of 15 moles of ethylene oxide and 1 mole of laurylamine, quaternised with dimethyl sulfate,
the adduct of 15 moles of ethylene oxide and 1 mole of stearylamine, quaternised with dimethyl sulfate,
the polyadduct of 1 mole of styrene oxide, 30 moles of ethylene oxide and 1 mole of stearylamine, quaternised with dimethyl sulfate,
the polyadduct of 6 moles of propylene oxide, 30 moles of ethylene oxide and 1 mole of caprylamine, quaternised with dimethyl sulfate,
the polyadduct of 1 mole of styrene oxide, 20 moles of ethylene oxide and 1 mole of stearylamine, quaternised with dimethyl sulfate.

On account of their good solubilising properties, however, those cationic surfactants of the formula II are particularly useful which, in addition to the higher alkyl radical R$_1$, carry a methyl or ethyl radical as substituent R$_2$, and in which R$_3$ is a phenyl-substituted C$_1$–C$_4$alkyl radical, and X$^\ominus$ has the given meaning. Also suitable are mixtures of such compounds which are obtained for example by starting from mixtures of fatty amines, e.g. coconut fatty amine, in the preparation of these surfactants.

In addition to the pure anionic and cationic surfactants it is also possible to use amphoteric surfactants as solubilisers. Examples of such compounds are:
the ammonium salt of the acid monosulfuric acid ester of the adduct of 2.5 moles of ethylene oxide and 1 mole of tallow amine, the ammonium salt of the acid monosulfuric acid ester of the adduct of 4 moles of ethylene oxide and 1 mole of tallow fatty amine, the ammonium salt of the acid monosulfuric acid ester of the adduct of 6 moles of ethylene oxide and 1 mole of tallow fatty amine, the ammonium salt of the acid monosulfuric acid ester of the adduct of 8 moles of ethylene oxide and 1 mole of tallow fatty amine, the ammonium salt of the amphoteric sulfuric acid ester of the adduct of 8 moles of ethylene oxide and 1 mole of tallow fatty amine, quaternised with chloroacetamide, the ammonium salt of the amphoteric sulfuric acid ester of the adduct of 30 moles of ethylene oxide and 1 mole of a $C_{18}$–$C_{22}$fatty amine, quaternised with dimethyl sulfate.

Surfactants belonging to the group of the amine oxides are also effective. Depending on the pH of the dyebath, such compounds have anionic character (neutral to basic liquor) or cationic (acid liquor) character. Examples of suitable amine oxide surfactants are:
N-dodecyl-N,N-dimethylamine oxide,
N-myristyl-N,N-dimethylamine oxide,
N-dodecyl-N,N-di-2-hydroxyethylamine oxide,
N-hexadecyl-N,N-di-2-hydroxyethylamine oxide,
N-hexadecyl-N,N-dimethylamine oxide,
N-oleyl-N,N-di-2-hydroxyethylamine oxide,
N-stearyl-N,N-di-2-hydroxyethylamine oxide,
N-coconut fatty acid amidopropyl-N,N-dimethylamine oxide,
N-tallow fatty acid amidopropyl-N,N-dimethylamine oxide.

Suitable nonionic surfactants with hydrotropic properties which, as mentioned, are used in admixture with anionic surfacants, are preferably adducts of ethylene oxide and/or propylene oxide with (a) a low molecular aliphatic polyol, or
(b) a saturated and/or unsaturated fatty alcohol of 6 to 20 carbon atoms, or
(c) an alkylphenol containing 4 to 12 carbon atoms in the alkyl moiety, or
(d) a hydroxybiphenyl, or
(e) a saturated and/or unsaturated $C_{14}$–$C_{20}$fatty amine, or
(f) a saturated and/or unsaturated $C_{14}$–$C_{20}$fatty acid, or
(g) a saturated and/or unsaturated fatty acid (N,N-bishydroxyalkyl)amide with 2 to 10 moles, preferably 4 to 8 moles, of ethylene oxide and/or propylene oxide being used per 1 mole of the compounds listed under (a) to (g).

Specific examples of such alkoxylates are:

(a) adducts of ethylene glycol, propylene glycol, glycerol or pentaerythritol with 5 to 10 moles of ethylene oxide and/or propylene oxide per mole of polyol,
(b) adducts of saturated and/or unsaturated $C_6$–$C_{20}$fatty alcohols with 2 to 10 moles of ethylene oxide and/or 2 to 10 moles of propylene oxide per mole of fatty alcohol, preferably of saturated $C_6$–$C_{10}$-fatty alcohols with 2 to 10 moles of ethylene oxide per mole of fatty alcohol,
(c) adducts of $C_4$–$C_{12}$alkylphenols with 2 to 10 moles of ethylene oxide and/or 2 to 10 moles of propylene oxide per mole of phenolic hydroxyl group,
(d) adducts of o- m- or p-phenylphenol with 2 to 10 moles of ethylene oxide and/or propylene oxide per mole of hydroxybiphenyl,
(e) adducts of saturated and/or unsaturated $C_{14}$–$C_{20}$fatty amines with 2 to 10 moles of ethylene oxide and/or 2 to 10 moles of propylene oxide per mole of fatty amine,
(f) adducts of saturated and/or unsaturated $C_{14}$–$C_{20}$fatty acids with 2 to 10 moles of ethylene oxide and/or 2 to 10 moles of propylene oxide per mole of fatty acid,
(g) adducts of saturated and/or unsaturated fatty acid (N,N-bis-hydroxyalkyl)amides, e.g. coconut fatty acid (N,N-bis-β-hydroxyethyl)amide, with 2 to 10 moles of ethylene oxide and/or propylene oxide per mole of fatty acid hydroxyalkylamide.

Mixtures of the adducts (a) to (g) with each other can also be used. These mixtures are obtained by mixing individual adducts or direct by alkoxylating a mixture of the compounds from which the adducts are derived.

Suitable saturated and/or unsaturated fatty alcohols in (b) are dodecanol, hexadecyl alcohol, palmityl alcohol, stearyl alcohol, oleyl alcohol or tallow fatty alcohols, hexanol, 2-ethylhexanol and decanol.

Suitable alkylphenols in (c) are n-butylphenol, tert-butylphenol, tributylphenol, octylphenol, p-amylphenol, hexylphenol, isooctylphenol, nonylphenol and dodecylphenol.

In addition to stearylamine and palmitylamine, a suitable fatty amine in (e) is in particular oleylamine.

Suitable saturated and/or unsaturated fatty acids in (f) are for example palmitic acid, preferably stearic acid and oleic acid.

Adducts which have proved particularly useful are those of groups (c) and (d), especially hydroxybiphenyl ethoxylates such as adducts of 6 or 8 moles of ethylene oxide with 1 mole of o-phenylphenol, or $C_4$–$C_9$alkylphenol ethoxylates, for example adducts of 6 to 8 moles of ethylene oxide with 1 mole of butylphenol.

The ethylene oxide/propylene oxide adducts are known or they can be prepared by methods which are known per se (q.v. for example N. Schönfeldt, Grenzflächenaktive Aethylenoxid-Addukte, Wissenschaftliche Verlagsgesellschaft mbH, Stuttgart, 1976).

The mixture ratio of nonionic to anionic surfactant is advantageously from 1:4 to 4:1. It is preferred to use those surfactant mixtures which contain about twice as much nonionic as an ionic surfactant.

A mixture which contains, as nonionic component, an adduct of 1 mole of o-phenylphenol or 1 mole of tert-butylphenol with 6 moles of ethylene oxide and, as anionic component, a nonylphenol diglycol ether sulfate, has a particularly pronounced solubilising action.

As regards the amount of surfactant or surfactant mixture, 5 to 100 parts, preferably 10 to 80 parts, of surfactant or surfactant mixture will be used per 1 part of disperse dye.

Depending on the desired depth of shade, the amounts in which the disperse dyes are used can vary within wide limits. In general, amounts of 0.01 to 10 percent by weight of one or more of the disperse dyes specified above are used, based on the goods to be dyed.

The hydrophobic fibre materials which can be dyed by the process of this invention are preferably materials made from linear high molecular esters of aromatic polycarboxylic acids with polyfunctional alcohols, for example of terephthalic acid and ethylene glycol or dimethylol cyclohexane, and copolymers of terephthalic acid and isophthalic acid and ethylene glycol. Provided the appropriate dyeing apparatus is available, these materials can be in any states of processing, e.g. in the form of flocks, tops, yarn, texturised filaments, woven or knitted goods, as well as blends with each other or with other fibres, for example polyester/polyamide or polyester/cotton blends.

If necessary, the aqueous liquor can contain conventional dyeing auxiliaries, preferably in small amounts. Examples of such auxiliaries are acids, preferably an organic lower monocarboxylic acid, e.g. formic acid or acetic acid, buffer salts such as ammonium sulfate or sodium acetate, wetting agents, emulsifiers or antifoams.

The goods to liquor ratio is usually 1:5 to 1:50, and the dyeing time is 5 to 60 minutes.

The process of the invention is preferably carried out in circulation dyeing machines, and the procedure is for example as follows. The unformulated dye or dyes, in the form of an aqueous suspension or filter cake, or also in solid form, for example as powder, are dissolved or solubilised in a feed tank connected to the dyeing machine in hot water of about 80° to 90° C., for example with a mixture of a nonionic and an anionic surfactant. The pH of the dye solution is adjusted to a value from 4 to 5.5 by addition of acetic acid and sodium acetate. Simultaneously in the dyeing machine, the polyester material to be dyed, e.g. in the form of a wound package such as a muff, cheese, dye beam or of a web, and water are also brought to a temperature from about 80° to 90° C., with liquor circulation from the inside to the outside. Then, by opening a valve, the dye solution is fed into the dyeing machine, optionally after passing through a filter. With further constant liquor circulation, advantageously from the inside to the outside or also with alternating circulation, e.g. at 5 minute intervals, the dyebath is heated at a rate of about 1° C./minute to a temperature in the range from 120° to 150° C., preferably from 125° to 135° C. After the desired depth of shade has been achieved or after complete bath exhaustion (dyeing time about 1 hour), the hot liquor is run off and the goods are rinsed and dried.

The invention is illustrated by the following Examples, in which parts and percentages are by weight.

EXAMPLE 1

In the feed tank of a circulation dyeing machine, 0.029 part of an unformulated disperse dye of the formula

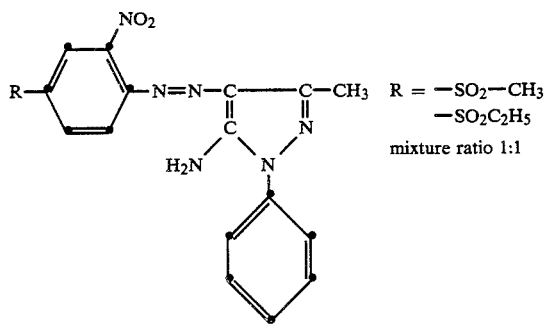

is dissolved at 90° C. in 34 parts of water by adding 1.8 parts of a surfactant solution. The surfactant solution has the following composition:

42.7% of the adduct of 1 mole of o-phenylphenol and 6 moles of ethylene oxide
42.7% of nonylphenol diglycol ether sulfate as 40% aqueous solution
14.2% of water
0.4% of an antifoam.

The pH of the dye solution is adjusted to 4.5 by addition of acetic acid and sodium acetate. The dye solution is then fed into the dyeing machine, which contains 324 parts of water of 90° C. and 15 parts of polyester fabric (Crimplene ®). The dye liquor is then heated to 130° C. at a rate of 1° C./minute. A perfectly level yellow dyeing is obtained after a dyeing time of 1 hour.

EXAMPLE 2

The procedure of Example 1 is repeated, replacing the surfactant solution employed therein by the same amount of a surfactant solution of the following composition:

42.7% of the adduct of 1 mole of tert-butylphenol and 6 moles of ethylene oxide
42.7% of nonylphenol diglycol ether sulfate as 40% aqueous solution
14.2% of water
0.4% of an antifoam.

EXAMPLE 3

The procedure of Example 1 is repeated, replacing the dye employed therein by 0.098 part of the unformulated disperse dye of the formula

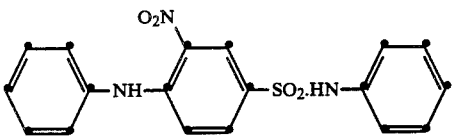

A full, level yellow dyeing is obtained on the polyester fabric.

EXAMPLE 4

The procedure of Example 1 is repeated, using 0.031 part of the unformulated disperse dye of the formula

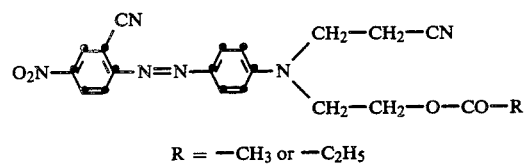

$R = -CH_3$ or $-C_2H_5$

A red dyeing is obtained.

EXAMPLE 5

The procedure of Example 1 is repeated, replacing the dye employed therein by 0.025 part of a mixture of the unformulated disperse dyes of the formulae

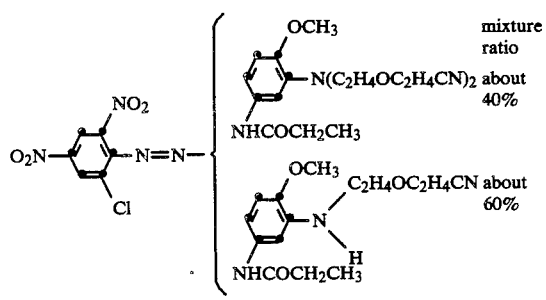

A dark blue dyeing is obtained on the polyester fabric.

EXAMPLE 6

The procedure of Example 1 is repeated, using 3.6 parts instead of 1.8 parts of the same surfactant solution and dissolving the unformulated dye at 80° C. The water in the dyeing machine is also heated to 80° C. After feeding the dye solution to the dyeing machine, the dye liquor is heated to 130° C. and dyeing is carried out as described in Example 1. A perfectly level dyeing is also obtained on the polyester fabric in this procedure.

EXAMPLE 7

The procedure of Example 1 is repeated, replacing the solution of the surfactant mixture employed therein by the same amount of a 60% aqueous solution of the cationic surfactant of the formula $$\left[ R-\overset{CH_3}{\underset{CH_3}{\overset{|}{N^\oplus}}}-CH_2-\underset{}{\underset{}{\bigcirc}}\right] \cdot Cl^\ominus$$

in which R is the alkyl radical of coconut fatty amine.

EXAMPLE 8

The procedure of Example 1 is repeated, replacing the solution of a surfactant mixture employed therein by 3 parts of a 40% aqueous solution of nonylphenol diglycol ether sulfate. In this procedure too, as also in Example 7, a perfectly level yellow dyeing is obtained on the polyester fabric.

EXAMPLE 9

A circulation dyeing machine, to which a feed tank is connected, is filled with 300 parts of water. Then 30 parts of Crimplene ® fabric, wound on a material carrier, is put into the water, which is heated to 130° C. Simultaneously, 300 parts of water containing 0.057 part of the unformulated disperse dye of the formula as indicated in Example 1 and 1.5 parts of a surfactant solution are likewise heated to 130° C. in the feed tank. The surfactant solution has the same composition as that indicated in Example 1. The pH of the liquor is adjusted to 4.5 by addition of acetic acid and sodium acetate. When the dyeing machine and the feed tank have the same temperature for 15 minutes, the water is run off from the dyeing machine and the dye solution is fed into the machine from the feed tank by means of a special device. A perfectly level golden yellow dyeing is obtained after a dyeing time of 1 hour at 130° C. The auxiliary combination has virtually no influence on the degree of exhaustion of the dye.

What is claimed is:

1. A process for dyeing hydrophobic fiber material under HT conditions with at least one unformulated disperse dye in an aqueous liquor, which process comprises:
   (a-1) dissolving in a dissolution vessel at least one unformulated disperse dye in water containing a solubilizingly or dispersingly effective amount of surfactant or surfactant mixture selected from the group consisting of anionic surfactants, cationic surfactants and mixtures of nonionic and anionic surfactants, each surfactant or mixture having a hydrotropic action on the disperse dye or dyes, the dissolution being carried out at a temperature of from 70° C. to 100° C.; and
   (b-1) feeding the dye solution into a dyeing apparatus which contains substrate and water heated to 70° to 100° C.; or
   (a-2) dissolving in a dissolution vessel at least one unformulated disperse dye in water containing a solubilizingly or dispersingly effective amount of surfactant or surfactant mixture selected from the group consisting of anionic surfactants, cationic surfactants and mixtures of nonionic and anionic surfactants, each surfactant or mixture having a hydrotropic action on the disperse dye or dyes, the dissolution being carried out under pressure at a temperature greater than 100° C.; and
   (b-2) feeding the dye solution into a closed dyeing apparatus which contains substrate and water heated to a temperature of from 100° C. to 150° C.; and
   c. adjusting the temperature of the dye liquor, if necessary, to the dyeing temperature; and
   d. dyeing the substrate in the temperature range of from 120° to 150° C. with continuous circulation of the dye liquor.

2. A process according to claim 1, wherein the surfactant which has a hydrotropic action on disperse dyes is a mixture of a nonionic and an anionic surfactant.

3. A process according to claim 1, wherein the surfactant which has a hydrotropic action on disperse dyes is an anionic surfactant of the formula I $$R-A-(CH_2CHO)_m-X, \quad (I)$$
$$\underset{R_1}{|}$$

wherein R is an aliphatic hydrocarbon radical of 8 to 22 carbon atoms, or a cycloaliphatic or aliphatic-aromatic hydrocarbon radical of 10 to 22 carbon atoms, $R_1$ is hydrogen or methyl, A is —O—, —NH— or $$-\underset{\underset{O}{\|}}{C}-O-,$$

X is the acid radical of an inorganic oxygen-containing acid or the radical of a polybasic carboxylic acid, and m is an integer from 1 to 20.

4. A process according to claim 1, wherein the surfactant which has a hydrotropic action on disperse dyes is acid sulfuric acid ester of an alkylphenol ethoxylate.

5. A process according to claim 1, wherein the surfactant which has a hydrotropic action on disperse dyes is a quaternary ammonium compound of the formula II $$R_1-\overset{R_2}{\underset{R_2}{\overset{|}{N^\oplus}}}-R_3 \quad X^\ominus \quad (II)$$

wherein
$R_1$ is a saturated and/or unsaturated $C_8$–$C_{22}$alkyl radical,
$R_2$ is a $C_1$–$C_4$alkyl radical or a polalkylene oxide chain containing 3 to 30 ethylene oxide and/or propylene oxide units or ethylene oxide and styrene oxide units, $R_3$ is a $C_1$-$C_4$alkyl radical which is unsubstituted or substituted by a hydroxy, methoxy or ethoxy group or by a carbamoyl or phenyl radical, $X^\ominus$ is the anion of an organic or inorganic acid.

6. A process according to claim 5, which comprises the use of a cationic surfactant of the formula II, wherein $R_2$ is methyl or ethyl, $R_3$ is $C_1$-$C_4$alkyl which is substituted by phenyl, and $R_1$ and $X^\ominus$ are as defined in claim 5.

7. A process according to claim 1, wherein the surfactant which has a hydrotropic action on disperse dyes is an adduct of ethylene oxide or propylene oxide with
   (a) a low molecular aliphatic polyol, or
   (b) a saturated or unsaturated fatty alcohol of 6 to 20 carbon atoms, or
   (c) an alkylphenol containing 4 to 12 carbon atoms in the alkyl moiety, or
   (d) a hydroxybiphenyl, or
   (e) a saturated or unsaturated $C_{14}$-$C_{20}$fatty amine, or
   (f) a saturated or unsaturated $C_{14}$-$C_{20}$fatty acid, or
   (g) a saturated or unsaturated fatty acid (N,N-bishydroxyalkyl)amide,
with 2 to 10 moles, of ethylene oxide or propylene oxide being used per 1 mole of the compounds listed under (a) to (g).

8. A process according to claim 1, wherein the surfactant which has a hydrotropic action on disperse dyes is an adduct of ethylene oxide with a hydroxybiphenyl or a $C_4$-$C_9$alkylphenol.

9. A process according to claim 2, wherein the nonionic surfactant is an adduct of 1 mole of o-phenylphenol with 6 moles or ethylene oxide or of 1 mole of tert-butylphenol with 6 moles of ethylene oxide, and the anionic surfactant is a nonylphenol diglycol ether sulfate.

10. A process according to claim 1, wherein 10 to 80 parts of surfactant or surfactant mixture are used per 1 part of dye.

11. A process according to claim 2, wherein the nonionic surfactant and the anionic surfactant are used in a ratio of 1:4 to 4:1.

12. A process according to claim 1, wherein the disperse dye is a metal-free monoazo or diazo dye, a nitro dye, an acridone dye, an anthraquinone dye or a quinophthalone dye.

13. A process according to claim 1, wherein the hydrophobic fiber material is polyester material.

14. The hydrophobic material dyed by the process according to claim 1.

15. A process according to claim 3 wherein m is an integer of from 1 to 5.

16. A process according to claim 7 wherein the amount of ethylene oxide or propylene oxide is 4 to 8 moles of the compounds listed under (a) to (g) in claim 7.

* * * * *